US012547120B2

(12) United States Patent
Garcin et al.

(10) Patent No.: US 12,547,120 B2
(45) Date of Patent: Feb. 10, 2026

(54) WATER-RESISTANT CLOSING DEVICE FOR WATCH CASE

(71) Applicant: The Swatch Group Research and Development Ltd, Marin (CH)

(72) Inventors: Simon Garcin, Salavaux (CH); Nassima Nasri, Nidau (CH)

(73) Assignee: The Swatch Group Research and Development Ltd, Marin (CH)

( * ) Notice: Subject to any disclaimer, the term of this patent is extended or adjusted under 35 U.S.C. 154(b) by 544 days.

(21) Appl. No.: 17/973,284

(22) Filed: Oct. 25, 2022

(65) Prior Publication Data

US 2023/0176527 A1 Jun. 8, 2023

(30) Foreign Application Priority Data

Dec. 7, 2021 (EP) .................................... 21212696

(51) Int. Cl.
*G04B 37/11* (2006.01)
*F16J 15/02* (2006.01)

(52) U.S. Cl.
CPC ............ *G04B 37/11* (2013.01); *F16J 15/022* (2013.01)

(58) Field of Classification Search
None
See application file for complete search history.

(56) References Cited

U.S. PATENT DOCUMENTS

2021/0311435 A1* 10/2021 Boaron .................. G04B 37/08

FOREIGN PATENT DOCUMENTS

| | | | |
|---|---|---|---|
| EP | 3 896 535 | A1 | 10/2021 |
| FR | 2 526 970 | A1 | 11/1983 |
| JP | 47-36273 | U | 12/1972 |
| JP | 2021-167809 | A | 10/2021 |

OTHER PUBLICATIONS

European Search Report for EP 21 21 2696 dated May 12, 2022.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

A water-resistant closing device for a watch case, the device including an annular gasket (1) arranged to be placed between a middle (2) and a back (3), a bezel or a crystal (4), or a bezel and a crystal, or a back and a crystal. The gasket (1) has on its middle portion a bulge (10) protruding on its outer lateral face (11), the bulge being arranged to be engaged against the middle (3) and compressed following the installation of the back or of the crystal on the middle, the bulge being delimited by an upper (12) and lower material countersink (13) on either side of the bulge (10) in the non-compressed state of the gasket (1) to facilitate its installation and its deformation.

11 Claims, 1 Drawing Sheet

WATER-RESISTANT CLOSING DEVICE FOR WATCH CASE

CROSS REFERENCE TO RELATED APPLICATIONS

This application is Non-Provisional application, claiming priority based on European Patent Application No. 21212696.5 filed Dec. 7, 2021.

TECHNICAL FIELD OF THE INVENTION

The invention relates to a water-resistance device for watch case. The invention also relates to a timepiece case comprising such a system. The invention also relates to a timepiece comprising such a system or such a case. Finally, the invention relates to a method for mounting such a timepiece or such a case.

TECHNOLOGICAL BACKGROUND

In the field of horology, it is sought to make the cases as water-resistant as possible and preserve their interior from any intrusion of humidity, that may generate steam and prevent any correct reading of the time. Over the longer term, it is also necessary to preserve all of the internal metal parts, of which those constituting the movement, from premature ageing due to oxidation. This need for water-resistance even proves to be particularly critical for watches intended for use in immersion, such as diving watches.

It is already known water-resistance devices of a crystal, of a bezel, of a back crystal, or of a back on a middle, wherein the crystal, the bezel and/or the back are driven and held in place on the middle by means of a gasket made of a material capable of being compressed and of achieving the water-resistance.

Gaskets that have the dual function of water-resistance and holding are in general I-ring gaskets made of elastomer and ring-shaped.

A known problem relating to annular gaskets relates to their susceptibility to pinching during the driving of the back, of the bezel or of one of the crystals on the middle and/or the back when they undergo axial friction or compressive forces, which may result in their partial, or even total, shearing, and in all cases significantly deteriorate the water-resistance properties sought. In order to reduce the risks of damaging such gaskets when they undergo deformation stresses, and at the same time improve their water-resistance properties, gaskets having a chamfer have been introduced. Due to the slope formed by the chamfer, the reliability of the water-resistance is increased, and at the same time, thanks to the reduction of friction forces exerted, the shearing stresses are also minimised and consequently the robustness and the life increased.

However, the risk of pinching remains present when the compression ratio of the gasket is high. The increase of the deformation of the gasket produces an accumulation of material at the base of the gasket and a foot forms, which results in difficulty during the driving operation, or even impossibility of performing the driving completely, as well as arduousness for the operator.

In addition, the fluctuations of the compression ratio inherent to the machining tolerances generate various levels of plastic deformations, which may be detrimental to the quality of the method (sensation of defect when closing, back poorly closed with daylight visible, and risk of reduced water-resistance).

One aim of the present invention is consequently to propose a gasket making it possible to improve the closing quality, which is more robust and which requires less force during the driving.

SUMMARY OF THE INVENTION

The invention resolves the aforementioned drawbacks by proposing a gasket having on its middle portion a bulge protruding on one of the lateral faces, and which makes it possible to both ensure the water-resistance and the holding between elements of a timepiece.

To this end, the present invention relates to a water-resistant closing device for a watch case, said device comprising a gasket having an upper face, a lower face, an inner lateral face and an outer lateral face, the gasket being arranged to be placed between a first element and a second element intended to be driven on the first element, said gasket having a material countersink at two opposite ends of one of the lateral faces over a height h' in such a way as to delimit on its middle portion a bulge of a thickness e' protruding on one of the lateral faces of the gasket, the bulge being arranged to be compressed following the installation of the second element on the first element.

According to the invention, the material countersink has a surface that is inscribed in a rectangle the length of which corresponds to the height h', and the width of which corresponds to the thickness e' of the bulge and of area Ar, and that the area As of the section of the material countersink is smaller than the area Ar of the rectangle and larger than half the area of the rectangle Ar/2.

In accordance with other advantageous variants of the invention:

- the material countersinks comprise a first upper countersink making it possible to guide the first element on the second element, and a second lower countersink making it possible to absorb the plastic deformation of the bulge at the two opposite ends of one of the lateral faces of the gasket;
- the bulge is symmetrical or dissymmetrical;
- the gasket has a height between 0.5 mm and 2.0 mm;
- the thickness of the gasket is between 0.3 mm and 0.8 mm;
- the height of the countersink is between 0.1 mm and 0.4 mm;
- the thickness of the bulge is between 0.05 mm and 0.25 mm;
- the gasket has a radial section the upper area S0 and the lower area S2 of which are smaller than the middle area S1, the areas being determined in the non-deformed state of the gasket;
- the bulge has a trapezoidal section, a bump-shaped, or ramp-shaped section.

The invention also relates to a watch case comprising a middle, a bezel, a back, a crystal and a water-resistance device in accordance with the invention.

The invention also relates to a watch comprising a water-resistance device and/or a case according to the invention.

BRIEF DESCRIPTION OF THE FIGURES

Other features and advantages of the invention will become apparent upon reading the following detailed description given by way of non-limiting example, with reference to the appended drawings wherein.

DETAILED DESCRIPTION OF THE INVENTION

Figure 1:
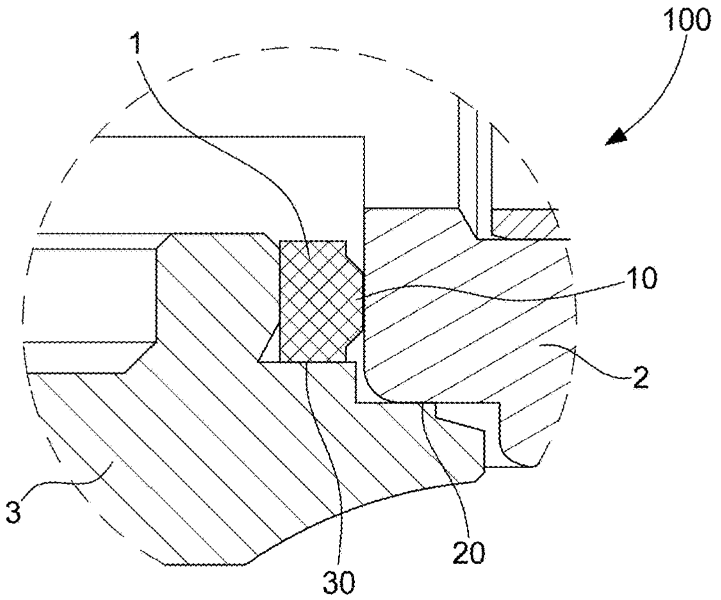
FIG. 1 shows a sectional view of a device according to a preferred embodiment of the invention.

A first embodiment of a watch equipped with a device in accordance with the invention is described below with reference to FIGS. 1, 2 and 3*a* to 3*c*.

The invention relates to a water-resistant closing device for a watch case, said device comprising a gasket 1 arranged to be placed between a first element and a second element intended to be driven on the first element. The first element and the second element being selected from: a middle, a back, a bezel, a crystal.

For the purpose of readability and understanding of the invention, only the driving of a back on a middle will be described subsequently. The driving of a crystal on a middle, of a crystal on a bezel, of a crystal on a back or of a bezel on middle will obviously be similar.

The watch comprises a timepiece case 100 and furthermore a horological movement that is intended to be mounted in the watch case in order to protect it from the outside environment. The horological movement may be an electronic movement or a mechanical movement, particularly an automatic movement.

The watch case 100 comprises a middle 2, a back 3 and a gasket seal 1. The watch case may also comprise a crystal and a bezel, rotating or not (not shown in the figures).

The back 3 is driven on the middle until coming to abut against the middle 2. The crystal is, itself also, driven on the middle, particularly by the action of the gasket seal.

The gasket seal 1 is ring-shaped and has an upper face, a lower face, an inner lateral face and an outer lateral face 11.

The gasket 1 comprises on its middle portion a bulge 10 protruding on one of its lateral faces, the bulge 10 being arranged to be engaged against the middle 2 and compressed between the back and the middle following the installation of the back 3 or of the crystal on the middle 2.

In the example illustrated, the bulge 10 protrudes on the outer lateral face in the case of the driving of a back on a middle. The bulge 10 may obviously protrude on the inner lateral face of the gasket, such a layout is for example useful in the context of driving a crystal on the middle, the bezel or the back.

The gasket seal 1 is made of a deformable material in such a way that it can be compressed.

The material for producing the gasket is selected from: asutane, polyether PU or polyester PU TPU, Pearlthane type polycaprolactone copolyester TPU, Isotane type polyadipate ester TPU, Pebax type polyether block amide TPU, Hytrel type polyester or Arnitel type polyether ester TPE, Grilamid type polyamides and copolymides, Zytel, Rilsan; as well as Tefzel, or Neoflon, type fluorinated polymers.

Figure 2:
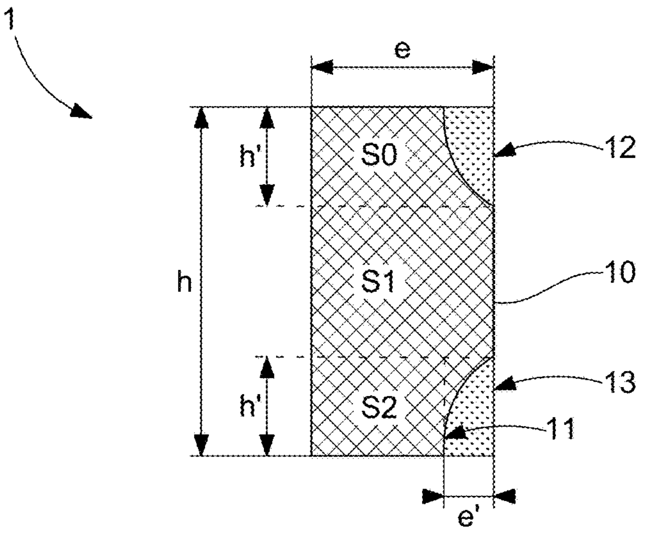
FIG. 2 shows a sectional view of a gasket equipping the device of FIG. 1.

As can be observed in FIG. 2, the countersinks 12, 13 disposed on either side of the bulge 10 form an upper and lower free volume in the non-compressed state of the gasket 1. The upper and lower free volumes 12, 13 each have a distinct function, namely to facilitate the installation of elements with one another for the upper free volume and to absorb the deformation of the bulge 10 for the lower free volume. Thus, the upper 12 and lower free volumes 13 make it possible to prevent pinching of the gasket 1 during the driving of elements with one another.

Advantageously, the gasket 1 has a radial section the upper area S0 and the lower area S2 of which are smaller than the middle area S1, the areas being determined in the non-deformed state of the gasket, the middle portion of the gasket ensuring the holding of elements with one another as well as the water-resistance.

The material countersinks comprise a first upper countersink 12 making it possible to guide the first element on the second element, and a second lower countersink 13 making it possible to absorb the plastic deformation of the bulge 10 at the two opposite ends of one of the lateral faces of the gasket. Obviously, a single and the same free volume shape makes it possible to ensure one function as well as the other according to the direction of mounting of the gasket.

Each countersink 12, 13 extends over a height h' and a thickness e' corresponding to the thickness of the bulge 10, in such a way as to delimit on its middle portion the bulge 10 protruding on one of the lateral faces.

Advantageously, the material countersink has a surface that is inscribed in a rectangle the length of which corresponds to the height h', and the width of which corresponds to the thickness e' of the bulge and of area Ar, and that the area As of the section of the material countersink is smaller than the area Ar of the rectangle and larger than half the area of the rectangle Ar/2.

In other words, the material surface remaining at the material countersink is inscribed in a right-angled triangle that has for apices an apex of the upper or lower face of the gasket and an apex of the bulge 10. The two sides of the right-angled triangle being parallel to the lateral edges and to the upper and lower edges, and having a length corresponding to the height h', and a width corresponding to the thickness e'.

Figure 3A:
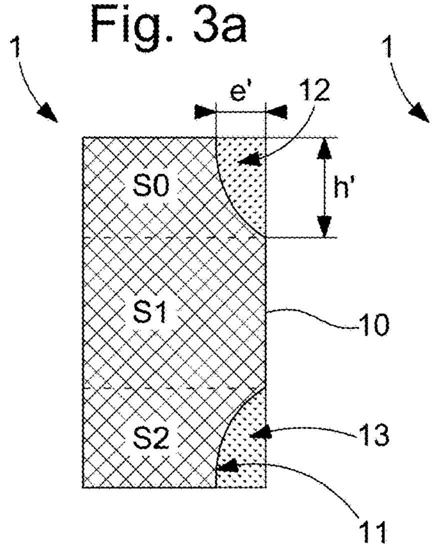
FIGS. 3*a* to 3*c* show sectional views of various embodiments of a gasket equipping a device in accordance with the invention.
Figure 3B:
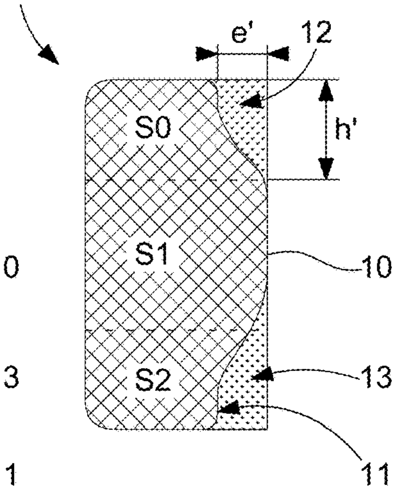
Figure 3C:
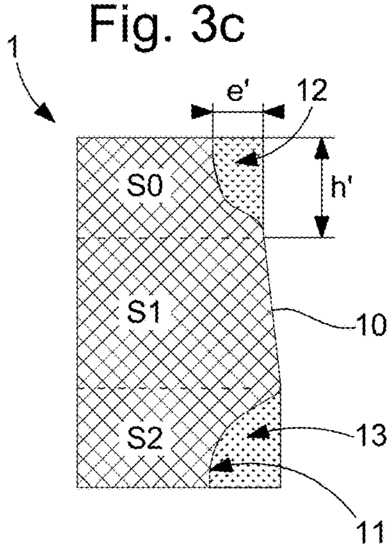

According to a preferred embodiment of the invention, the bulge 10 of the gasket 1 is symmetrical in relation to the middle plane (plane separating the gasket in its centre) of the gasket 1, as illustrated in FIG. 2. The bulge may also be dissymmetrical as illustrated in FIG. 3*c*. The same applies for the upper and lower material countersinks 12, 13.

As illustrated in the figures showing the various embodiments, the bulge 10 has a trapezoidal section, a bump-shaped, or even ramped-shape, section.

In the case of the preferred embodiment illustrated in FIG. 2, the bulge 10 has a trapezoidal shape in such a way as to form a flat surface followed by an inclined surface.

The gasket 1 has a height h between 0.5 mm and 2.0 mm, and a thickness e between 0.3 mm and 0.8 mm.

The material countersink 12, 13 comprises a height h between 0.1 mm and 0.4 mm and a thickness e between 0.05 mm and 0.25 mm.

The free volume on the lower portion of the gasket makes it possible to solve the problems related to the machining tolerances that may generate various levels of plastic deformations and thus be detrimental to the quality of the method for mounting the back 3 on the middle 2 (sensation of defect when closing, back poorly closed with daylight visible, and risk of reduced water-resistance).

Likewise, the free volume on the upper portion of the gasket makes it possible to form a free volume for guiding or pre-engaging on its upper portion and thus to prevent pinching or damage of the gasket. Indeed, according to a batch of variations/possible circumstances (centring, positioning, etc.), it may be that the engagement of the gasket is carried out with a co-flatness and/or concentricity defect. A pressure concentration takes place on a restricted portion of the gasket, and it is damaged, such as bitten by the middle.

A method for mounting a device comprising a back 3, a middle 2 and a gasket 1, in accordance with the invention is described below.

In a first step, the gasket 1 is driven on the back 3, abutting against a shoulder 30 of the back 3.

In a second step, the back 3 is presented opposite the middle 2.

In a third step, the back 3 and gasket 1 assembly is driven into the middle 2 until the back 3 comes to abut against a shoulder 20 of the middle 2, the gasket 1 then being compressed between the middle 2 and the back 3.

Once the whole has been assembled, the device 10 forms a water-resistance system of the case 100 at the interface between the middle 2 and the back 3.

Obviously, a similar mounting method may be implemented to mount a crystal on the middle.

The invention also relates to a watch case 100 comprising a middle 2, a back 3, a crystal and a water-resistance device in accordance with the invention.

The invention also relates to a watch comprising a water-resistance device and/or a case according to the invention.

The invention claimed is:

1. A water-resistant closing device for a timepiece, comprising:
- a gasket (1) having an upper face, a lower face, an inner lateral face and an outer lateral face (11), the gasket (1) being arranged to be placed between a first element (2) and a second element (3) configured to be driven on the first element (2), said gasket (1) having a material countersink (12, 13) at two opposite ends of one lateral face over a height (h') in such a way as to delimit on a middle portion of the gasket a bulge (10) of a thickness (e') protruding on the one lateral face of the gasket (1), the bulge (10) being arranged to be compressed following the installation of the second element (3) on the first element (2),
- wherein the material countersink (12, 13) has a surface that is inscribed in a rectangle the length of which corresponds to the height (h'), and the width of which corresponds to the thickness (e') of the bulge and of area $A_r$,
- wherein an area As of the section of the material countersink (12, 13) is smaller than the area $A_r$ of the rectangle and larger than half the area of the rectangle $A_r/2$, and
- wherein the height (h') of the countersink (12, 13) is between 0.1 mm and 0.4 mm.

2. The water-resistant closing device according to claim 1, wherein the material countersink forms a first upper countersink (12) to guide the first element on the second element, and a second lower countersink (13) to absorb a plastic deformation of the bulge (10).

3. The water-resistant closing device according to claim 1, wherein the bulge (10) and/or the material countersink (12, 13) is symmetrical or dissymmetrical.

4. The water-resistant closing device according to claim 1, wherein the gasket (1) has a height (h) between 0.5 mm and 2.0 mm.

5. The water-resistant closing device according to claim 1, wherein the thickness (e) of the gasket (1) is between 0.3 mm and 0.8 mm.

6. The water-resistant closing device according to claim 1, wherein the thickness (e') of the bulge (10) is between 0.05 mm and 0.25 mm.

7. The water-resistant closing device according to claim 1, wherein the gasket (1) has a radial section, an upper area (S0) and a lower area (S2) of which are smaller than a middle area (S1), the areas being determined in a non-deformed state of the gasket (1).

8. The water-resistant closing device according to claim 1, wherein the bulge (10) has a trapezoidal section, a bump-shaped, or ramp-shaped, section.

9. A watch case (100) comprising a middle (2), a back (3), a crystal and the water-resistant closing device according to claim 1.

10. A watch comprising the water-resistant closing device according to claim 1.

11. A water-resistant closing device for a timepiece, comprising:
- a gasket (1) having an upper face, a lower face, an inner lateral face and an outer lateral face (11), the gasket (1) being arranged to be placed between a first element (2) and a second element (3) configured to be driven on the first element (2), said gasket (1) having a material countersink (12, 13) at two opposite ends of one lateral face over a height (h') in such a way as to delimit on a middle portion of the gasket a bulge (10) of a thickness (e') protruding on the one lateral face of the gasket (1), the bulge (10) being arranged to be compressed following the installation of the second element (3) on the first element (2),
- wherein the material countersink (12, 13) has a surface that is inscribed in a rectangle the length of which corresponds to the height (h'), and the width of which corresponds to the thickness (e') of the bulge and of area Ar,
- wherein an area As of the section of the material countersink (12, 13) is smaller than the area Ar of the rectangle and larger than half the area of the rectangle Ar/2, and
- wherein the thickness (e') of the bulge (10) is between 0.05 mm and 0.25 mm.

* * * * *